United States Patent [19]

Cho

[11] Patent Number: 5,444,845
[45] Date of Patent: Aug. 22, 1995

[54] RASTER GRAPHICS SYSTEM HAVING MASK CONTROL LOGIC

[75] Inventor: Young-Keon Cho, Seoul, Rep. of Korea

[73] Assignee: Samsung Electronics Co., Ltd., Rep. of Korea

[21] Appl. No.: 83,339

[22] Filed: Jun. 29, 1993

[51] Int. Cl.[6] ............................................. G06F 15/00
[52] U.S. Cl. ................................................... 395/162
[58] Field of Search ............... 395/119, 120, 126, 127, 395/133, 134, 162–164, 425; 345/191, 189, 98

[56] References Cited

U.S. PATENT DOCUMENTS

5,233,689 8/1993 Rhoden et al. ...................... 395/164

Primary Examiner—Mark R. Powell
Assistant Examiner—Kee M. Tung
Attorney, Agent, or Firm—Evenson, McKeown, Edwards & Lenahan

[57] ABSTRACT

A raster graphic system is provided having a scan converter for producing pixel data, a pixel cache for storing data sequentially supplied from the scan converter, and a frame buffer. The system includes a mask control logic circuit arranged between the pixel cache and the frame buffer. The mask control logic circuit allows the pixel data stored in the frame buffer to be maintained as is, without reading the pixel data out from the frame buffer when new data is to be written into the frame buffer. The mask control logic circuit includes NOR gates for NORing data of the tile pixels from the pixel cache, in which data is unwritten by the scan converter. The mask control logic circuit further includes OR gates for ORing the outputs of the NOR gates with write enable signal WE#, and for supplying the ORed results as write enable signals WE#0 to WE#1 to the frame buffer.

2 Claims, 8 Drawing Sheets

PIXEL CACHE

PIXEL CACHE

PIXEL CACHE

FIG. 5J

FRAME BUFFER

FIG. 5I

PIXEL CACHE

FIG. 6B

FRAME BUFFER

FIG. 6A

PIXEL CACHE

FIG. 6D

FRAME BUFFER

FIG. 6C

PIXEL CACHE

PIXEL CACHE

RASTER GRAPHICS SYSTEM HAVING MASK CONTROL LOGIC

BACKGROUND OF THE INVENTION

1. Field of the Invention

The present invention relates to a computer raster graphics system which produces picture images by way of a raster manner.

2. Description of the Prior Art

Recently, with developed high performance microprocessor and inexpensive high-density memory element, a computer graphics technology has been developed. Particularly, animation and real-time simulation of a three-dimensional object is actively studying.

In general, such a high-performance system which assists a three-dimensional graphics includes a geometry engine functioning transformation process (that is, changing a position size to denote a graphic image in the computer graphics) and a clipping process (that is, removing an image portion out of a boundary of a display unit in the computer graphic) and a raster engine serving to rasterize.

The raster engine has a bottleneck which results from repeated operations and frequent access to a frame buffer for scan converting, black surface removement and shading (or rendering).

However, with an advanced high-performance engine (or processor) developed recently, an accessing time to the frame buffer is an important bottleneck factor in a graphic pipeline than the operation capability of the engine. For this reason, a method of processing multiple pixels simultaneously in parallel to achieve a high speed rasterization is considered.

Such a conventional system employs a cache memory to improve performance and operating speed of the system.

Figure 1:
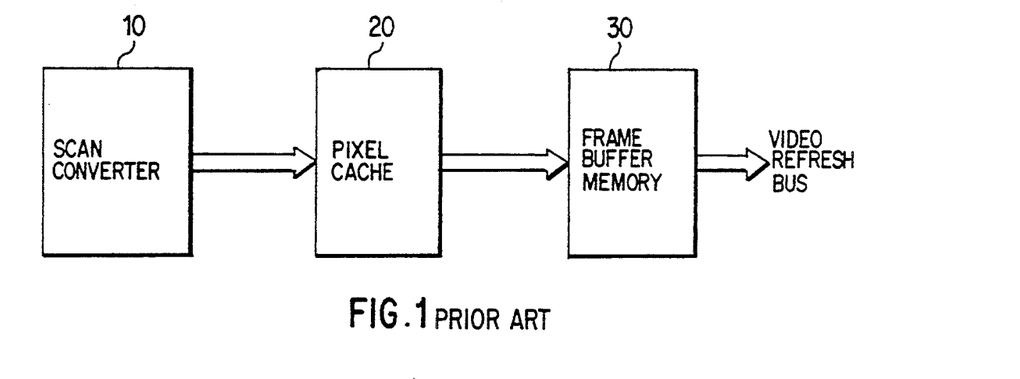
FIG. 1 is a schematic block diagram of a conventional raster graphic system.

FIG. 1 shows a conventional raster graphics system. As seen in FIG. 1, the system has a pixel cache memory 20 between a scan converter 10 which generates data related to the respective pixels and a frame buffer memory 30 which stores pixel data.

The pixel cache 20 has a capacity smaller than that of the buffer but has an access time higher than that of the frame buffer 30 (substantially approx. 5-10 times higher). Interface between the frame buffer 30 and the pixel cache 20 results in that a plurality word (or block) unit of data is transferred to thereby increase the band width between the frame buffer 30 and the pixel cache 20 and, also, the working time of the system is reduced due to locality of reference.

Referring to FIG. 4, a general pixel map between frame buffers FB0 to FB3 is illustrated.

Substantially, the pixel cache is defined in a tile formation which is formed by a plurality of rectangular pixels or linearly arranged pixels. Accordingly, the number of pixels which are updated per cycle depends on the size of the tile.

Assuming that the larger the tile a large number of pixels per cycle are updated. Therefore, a high performance of the system can be assured but the cost of the pixel cache is relatively increased.

Further, the number of pixels to be updated per cycle depends on the structure of the tile and operation type thereof. That is, in a video image represented by way of a vector drawing and a wireframe (a formation of an object is three-dimensionally described by a large quantity of lines so as to represent a three-dimensional object formation in computer graphics), more pixels are updated (that is cache hit) in a rectangular tile structure (for example, 4×4). Alternatively, in polygon fill and shading or horizontal vector drawing, wire pixels are updated in a structure in which pixels are linearly arranged along an X-axis, that is, a matrix structure of 16×1.

This specification will be described with reference to a pixel cache of which a tile is formed by 8×8 pixels for easily understanding the present invention.

Now, the operation of such a conventional system will be described with reference FIG. 5.

Figure 5A:
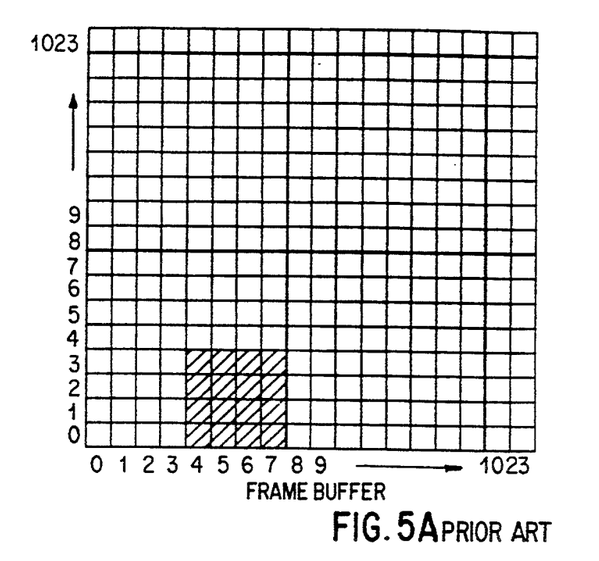
Figure 5B:
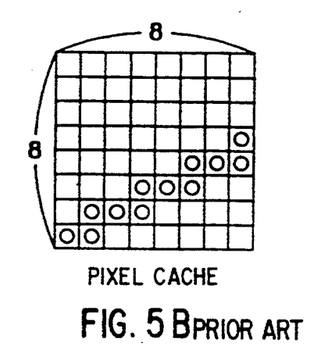

FIG. 5(A) illustrates a pixel cache in which pixel data is stored by the scan converter (refer to 10 in FIG. 1).

The pixel data in the pixel cache is transferred to and stored in a predetermined area of the frame buffer, as shown in FIG. 5 (B) and the pixel cache is then cleared.

Figure 5C:
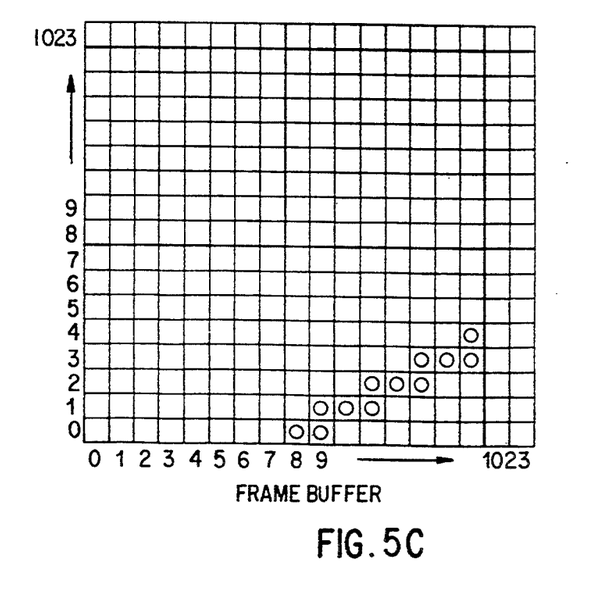
Figure 5D:
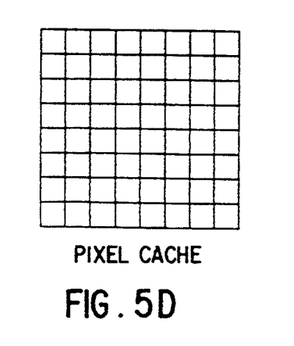
Figure 5E:
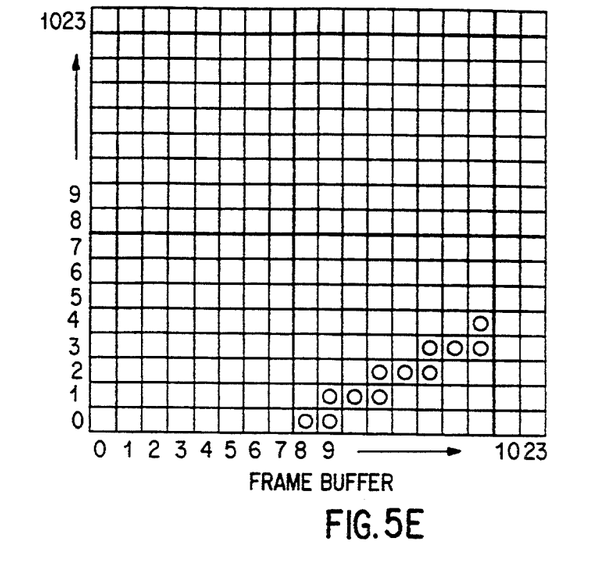
Figure 5F:
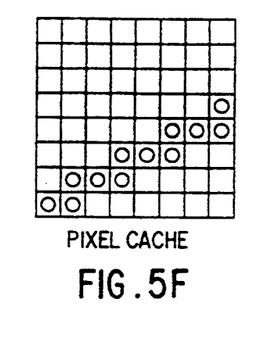
Figure 5G:
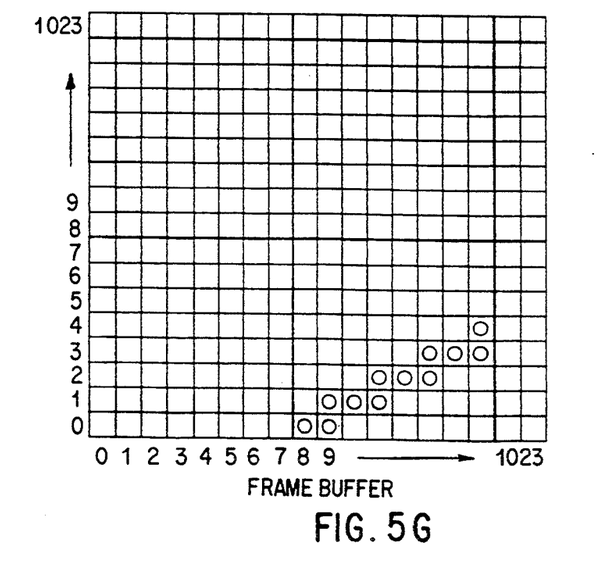
Figure 5H:
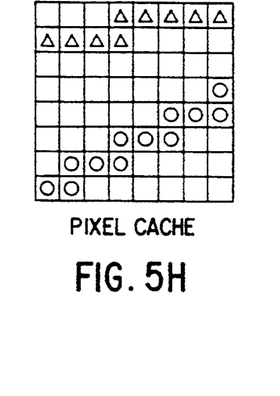
Figure 5I:
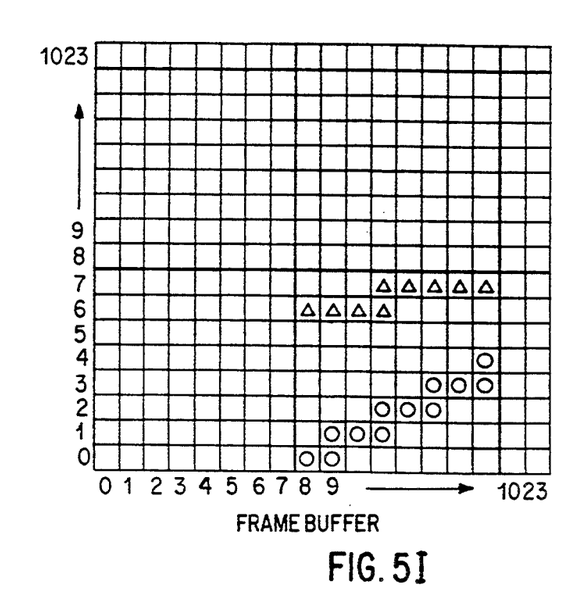
Figure 5J:
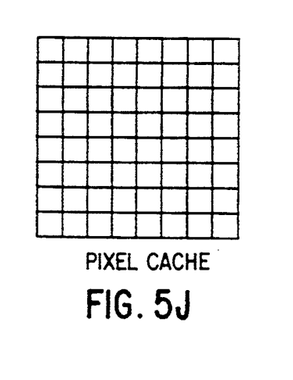
Figure 6A:
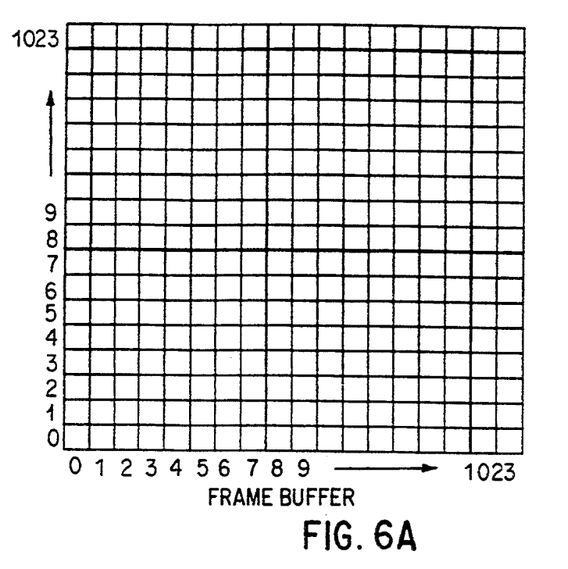
Figure 6B:
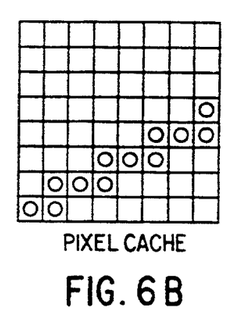
Figure 6C:
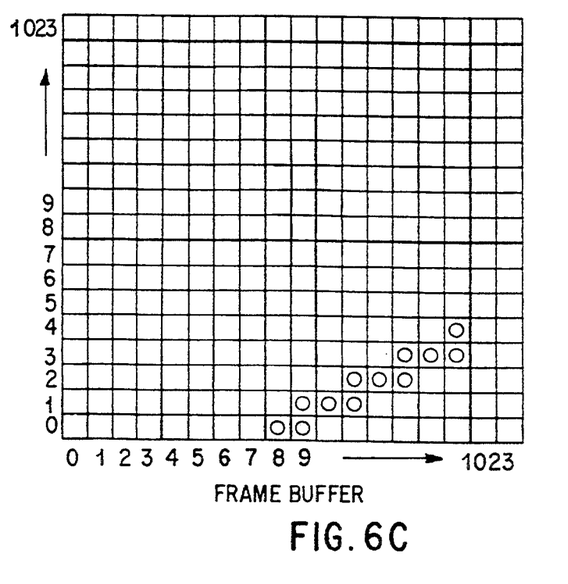
Figure 6D:
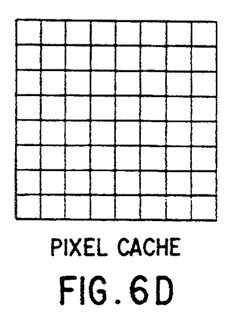
Figure 6E:
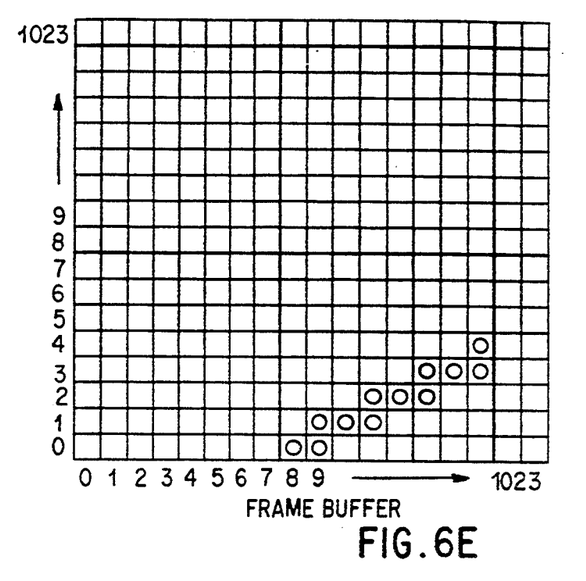
Figure 6F:
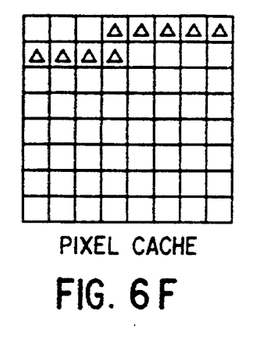
Figure 6G:
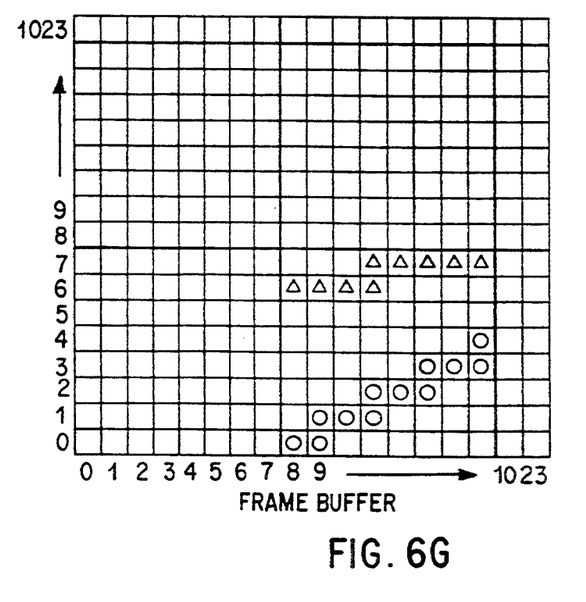
Figure 6H:
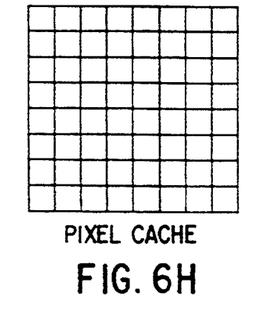

When the pixel data is stored in the block or tile of the frame buffer, the pixel data pre-stored in the frame buffer is stored in the pixel cache as shown in FIG. 5(C) so as to prevent the pre-stored data frame being damaged. This prevents the area in the frame buffer where existing pixel data is stored from being set and cleared to values of 0 when a tile of pixel cache written new vector pixel data is transferred and stored in the frame buffer.

When a cache failure occurs, the pixel data stored in the pixel cache is written into the frame buffer.

With such a conventional system, however, when the cache failure occurs, the pixel data stored in the frame buffer is stored in the pixel cache as new pixel data is supplied to the frame buffer.

As a result, one drawback is that the load in the data transfer between the pixel cache and the frame buffer undesirably increases.

SUMMARY OF THE INVENTION

Accordingly, an object of the present invention is to provide a mask control logic wherein in a computer graphic system having a pixel cache, a load in data transfer between a pixel cache and a frame buffer can be reduced.

To achieve the above object, according to the present invention, there is provided a raster graphic system having a scan converter 10 for producing pixel data, a pixel cache 20 for storing sequentially supplied data from the scan converter and a frame buffer, including:

a mask control logic arranged between the pixel cache and the frame buffer, the mask control logic allowing the pixel data stored in the frame memory to be maintained as it is without reading the pixel data out from the frame buffer when new tile data is to be written into the frame buffer.

According to an aspect of the invention, the mask control logic includes NOR gates for NORing data of the tile pixels from the pixel cache, in which data are unwritten by the scan converter, and OR gates for ORing the outputs of the NOR gates and a write enable signal WE# and supplying the ORed results as write enable signals WE#0 to WE#1 to the frame buffer.

This structure of the mask control logic may be changed depending upon the characteristics of the system hardware.

The above and other objects, features and advantages of the present invention will be apparent from the following description taken with reference to the accompanying drawings.

BRIEF DESCRIPTION OF THE DRAWINGS

FIGS. 5a–5j are views for explaining operation of the conventional graphics system; and, FIGS. 6a–6g are views for explaining operation of the graphics system according to the present invention.

DETAILED DESCRIPTION OF THE INVENTION

Hereinafter, the present invention will be described with reference to FIGS. 2, 3 and 6.

Figure 2:
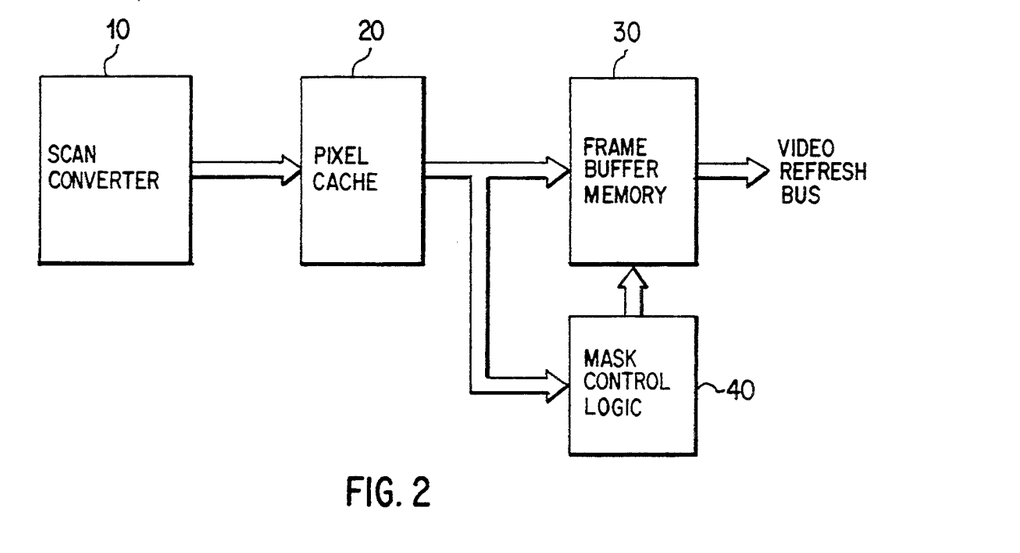
FIG. 2 is a block diagram of a raster graphic system according to the present invention.
Figure 3:
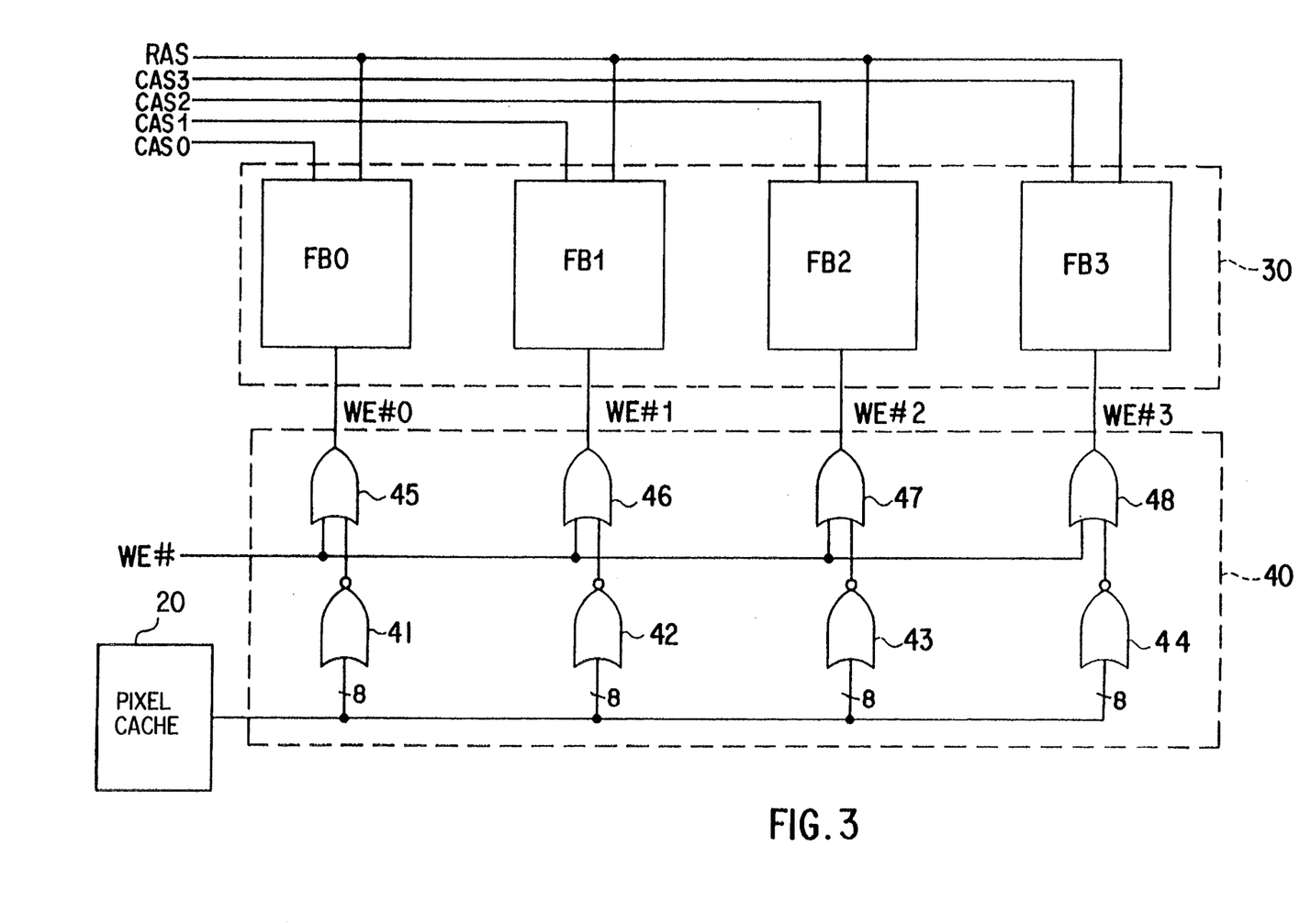
FIG. 3 is a view of a embodiment of the present invention.
Figure 4A:
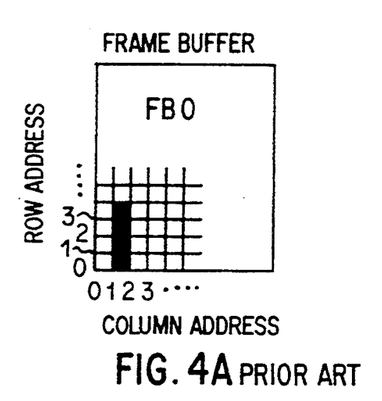
FIG. 4 is a view showing a pixel map between a screen and frame buffer memory.
Figure 4B:
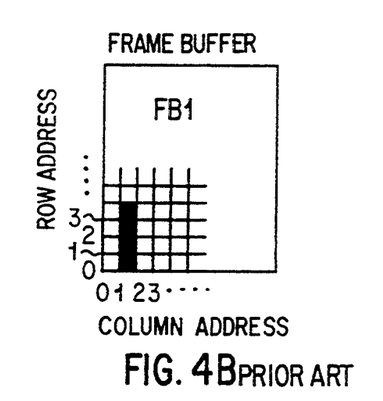
Figure 4C:
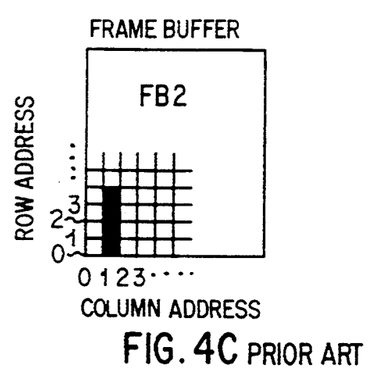
Figure 4D:
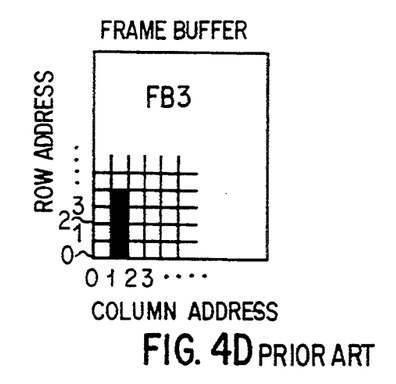
Figure 4E:
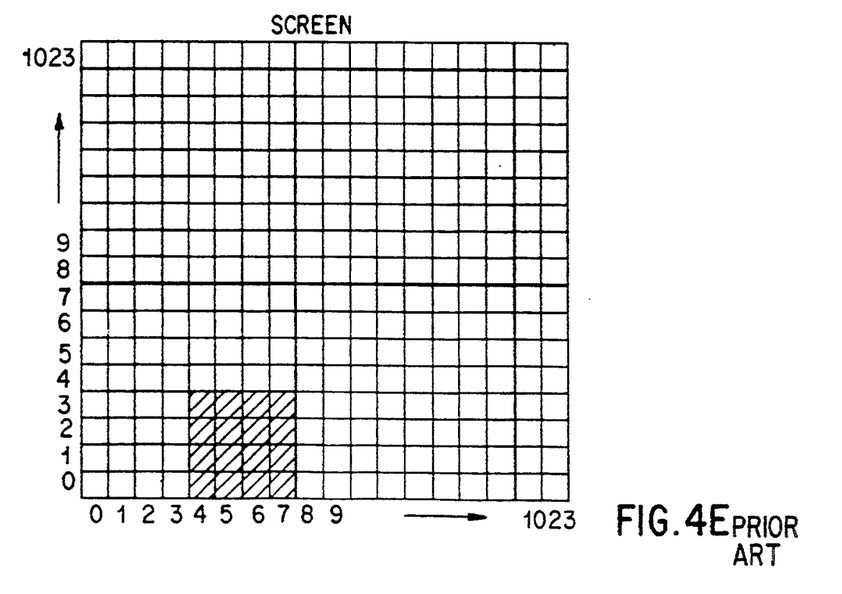

FIG. 2 is a block diagram of a raster graphics system according to the present invention and FIG. 3 is view showing an embodiment of the present invention and embodying a pixel map shown in FIG. 4.

The description is made with reference to a tile which is formed by 8×8 pixels, for example. This tile may be changed in size and arrangement in consideration of the cache hit ratio (for example, 4×4, 16×16, 16×1, 64×1, ...).

After a pixel cache is cleared so as to draw a rectangular (8×3 pixels) formation on a screen, the scan converter 10 sequentially fills up the pixel cache 20 with pixel data one by one (refers to FIG. 6 (A)). When the pixel cache 20 is completely filled up with 12 pixels, if cache failure occurs, then vector pixel data previously stored in the pixel cache is written into the frame buffer and the pixel cache is cleared (refer to FIG. 6 (B)). Consequently, as shown in FIG. 6 (C), the scan converter 10 writes data of pixels related to a different vector drawing into the pixel cache 20.

If cache failure occurs in drawing a subsequent figure, the pixel data stored in the tile of the pixel cache is written into the frame buffer and the pixel cache is cleared. Continuously, the aforementioned operation is repeatedly effected to draw the figures.

But, when the cache failure occurs, it must prevent the data previously stored in the frame buffer from being damaged by tile data which is supplied for the pixel cache in writting the data for the pixel cache into the frame buffer.

More specifically, as previously described, the vector pixel data written in the frame buffer must not overlap with the tile pixel data of the pixel cache to be subsequently written thereto.

For this reason, the present invention provides a mask control logic 40 showing in FIG. 2.

Referring to FIG. 3, a preferred embodiment of the mask control logic 40 is illustrated. Assuming that, from the fact that the pixel cache 20 is initially cleared, when the pixel data stored in the pixel cache 20 is written into the frame buffer 30, data of the pixels in which no data is written in all of the pixels in the tile of the pixel cache are set to 0. First, when the data if the pixel data is defined by 8 bits, the 0000 0000 pixels in which no data is written are NOR gates 41 to 44, all of the outputs of the NOR gates are set to 1. Accordingly, outputs WE#0 to WE#3 of OR gates 45 to 48 become 1 regardless of a write enable signal WE#, and the frame buffers FB0 to FB3 are thus deactivated. As a result, the data stored in the frame buffers FB0 to FB3 are thus deactivated. As a result, the data stored in the frame buffers FB0 to FB3 does not overlap and is naturally maintained.

As described above, according to the present invention, since it is unnecessary to readout the data previously stored in the frame buffer to the pixel cache even is now pixel data is stored in the pixel cache by the scan converter, the load in data transfer between the pixel cache and frame buffer is reduced by ½, thereby remarkably improving the processing speed of the system.

The present invention is not limited to the structure described above and it is to be understood that many changes and modifications will be made therein without departing from the spirit and scope of the invention.

What is claimed is:

1. A raster graphic system having a scan converter for producing pixel data, a pixel cache for storing pixel data sequentially supplied from the scan converter, and a frame buffer, comprising:

a mask control logic circuit arranged between said pixel cache and said frame buffer, wherein said mask control logic circuit comprises NOR gates for NORing pixel data in a tile of the pixel cache in which the pixel data is unwritten by the scan converter, and OR gates for ORing outputs of the NOR gates with a write enable signal WE#, wherein the ORed results are supplied as write enable signals WE#0 to WE#1 to said frame buffer.

2. A raster graphic system according to claim 1, wherein said mask control logic circuit allows the pixel data stored in the frame buffer to be maintained in its current state when no tile pixel data is to written into said frame buffer.

* * * * *